US012513484B2

(12) United States Patent
Franco

(10) Patent No.: US 12,513,484 B2
(45) Date of Patent: Dec. 30, 2025

(54) SYSTEMS AND METHODS FOR PROVIDING BONE CONDUCTION AUDIO

(71) Applicant: Harman International Industries, Incorporated, Stamford, CT (US)

(72) Inventor: Alfredo Fernandez Franco, Sherman Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 287 days.

(21) Appl. No.: 18/345,119

(22) Filed: Jun. 30, 2023

(65) Prior Publication Data

US 2025/0008289 A1 Jan. 2, 2025

(51) Int. Cl.
*H04S 7/00* (2006.01)
*H04R 5/033* (2006.01)
*H04R 5/04* (2006.01)

(52) U.S. Cl.
CPC ............. *H04S 7/304* (2013.01); *H04R 5/033* (2013.01); *H04R 5/04* (2013.01); *H04S 7/307* (2013.01); *H04R 2460/13* (2013.01); *H04S 2420/01* (2013.01)

(58) Field of Classification Search
CPC ...... H04S 7/304; H04S 7/307; H04S 2420/01; H04R 5/033; H04R 5/04; H04R 2460/13
See application file for complete search history.

(56) References Cited

U.S. PATENT DOCUMENTS 10,419,843 B1 * 9/2019 Mehra .................... H04R 5/033
10,658,995 B1 * 5/2020 Bowers ................ H04R 1/1041
10,728,649 B1 * 7/2020 Holman ............... H04R 1/1091
10,966,043 B1 * 3/2021 Khaleghimeybodi .... H04S 7/30
2019/0313201 A1 * 10/2019 Torres ...................... H04R 5/04
2021/0076123 A1 * 3/2021 Zhang .................. H04R 1/1091
2021/0235189 A1 * 7/2021 Secall ..................... H04S 1/002
2024/0137693 A1 * 4/2024 Fu .......................... H04R 5/027

* cited by examiner

*Primary Examiner* — Jason R Kurr
(74) *Attorney, Agent, or Firm* — Burris Law, PLLC

(57) ABSTRACT

A method includes generating by a bone conduction headset, based on one or more audio signals, a three-dimensional audio scene. A frequency response of the one or more signals is adjusted by the bone conduction headset based on the three-dimensional audio scene, wherein the adjusted frequency response simulates a response of an ear canal of a user. Audio content is outputted by the bone conduction headset based on the adjusted frequency response.

17 Claims, 3 Drawing Sheets

SYSTEMS AND METHODS FOR PROVIDING BONE CONDUCTION AUDIO

FIELD

The present disclosure relates to bone conduction headsets, and more particularly, to systems and methods for generating audio signals for the bone conduction headset.

BACKGROUND

The statements in this section merely provide background information related to the present disclosure and may not constitute prior art.

Bone conduction headsets provide an alternative to traditional over-ear or in-ear headsets. Bone conduction headsets provide to a user a different way to receive audio signals as the audio signals are not received directly into the user's ear canal. However, because the audio signals are not received directly into the user's ear canal, a perceived sound the user hears can be less pleasing (e.g., less pure) than sound received via the user's ear canal, thereby affecting the user experience.

SUMMARY

This section provides a general summary of the disclosure and is not a comprehensive disclosure of its full scope or all of its features.

The present disclosure provides a method for generating by a bone conduction headset, based on one or more audio signals, a three-dimensional audio scene; adjusting by the bone conduction headset, based on the three-dimensional audio scene, a frequency response of the one or more audio signals, wherein the adjusted frequency response simulates a response of an ear canal of a user; and outputting by the bone conduction headset, based on the adjusted frequency response, an audio content; wherein the three-dimensional audio scene is generated by a binaural rendering engine; wherein the frequency response is adjusted by an ear-canal response reconstruction filter; further comprising: adjusting by a device-specific EQ, based on the three-dimensional audio scene and a type of the bone conduction headset, a frequency response of the bone conduction headset; wherein generating the three-dimensional audio scene comprises: simulating, based on reverberation modeling, a reflection of the one or more audio signals against one or more surfaces; and applying a head-related transfer function (HRTF) filter and the simulation to the one or more audio signals, wherein the HRTF filter is created based on a database of HRTF measurements; wherein the HRTF measurements are based on an average head shape and an average ear shape of a group of users; wherein outputting the audio content comprises: causing, based on the adjusted frequency response, one or more transducers to vibrate against one or more cheekbones of the user, wherein the vibration causes the user to receive the audio content as the immersive audio experience; wherein the bone conduction headset includes a head tracking system, wherein the head tracking system communicates with the binaural rendering engine and compensates for a movement of a head of the user.

The present disclosure provides a bone conduction headset comprising: a binaural rendering engine configured to: generate, based on one or more audio signals, a three-dimensional audio scene; an ear-canal response reconstruction filter configured to: adjust, based on the three-dimensional audio scene, a frequency response of the one or more audio signals, wherein the adjusted frequency response simulates a response of an ear canal of a user; and one or more transducers configured to: output, based on the adjusted frequency response, an audio content; wherein the bone conduction headset is further configured to: adjust by a device-specific EQ, based on the three-dimensional audio scene and a type of the bone conduction headset, a frequency response of the bone conduction headset; wherein generating the three-dimensional audio scene comprises: simulating, based on reverberation modeling, a reflection of the one or more audio signals against one or more surfaces; and applying a head-related transfer function (HRTF) filter and the simulation to the one or more audio signals, wherein the HRTF filter is created based on a database of HRTF measurements; wherein the HRTF measurements are based on an average head shape and an average ear shape of a group of users; wherein outputting the audio content comprises: causing, based on the adjusted frequency response, one or more transducers to vibrate against one or more cheekbones of the user, wherein the vibration causes the user to receive the audio content as the immersive audio experience; wherein the bone conduction headset includes a head tracking system, wherein the head tracking system communicates with the binaural rendering engine and compensates for a movement of a head of the user.

The present disclosure provides one or more non-transitory computer-readable media storing processor-executable instructions that, when executed by at least one processor, cause the at least one processor to: generate by a bone conduction headset, based on one or more audio signals, a three-dimensional audio scene; adjust by the bone conduction headset, based on the three-dimensional audio scene, a frequency response of the one or more audio signals, wherein the adjusted frequency response simulates a response of an ear canal of a user; and output by the bone conduction headset, based on the adjusted frequency response, an audio content; wherein the at least one processer is further caused to: adjust by a device-specific EQ, based on the three-dimensional audio scene and a type of the bone conduction headset, a frequency response of the bone conduction headset; wherein outputting the audio content comprises: causing, based on the adjusted frequency response, one or more transducers to vibrate against one or more cheekbones of the user, wherein the vibration causes the user to receive the audio content; wherein the three-dimensional audio scene is generated by a binaural rendering engine; wherein the frequency response is adjusted by an ear-canal response reconstruction filter; wherein the bone conduction headset includes a head tracking system, wherein the head tracking system communicates with the binaural rendering engine and compensates for a movement of a head of the user.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
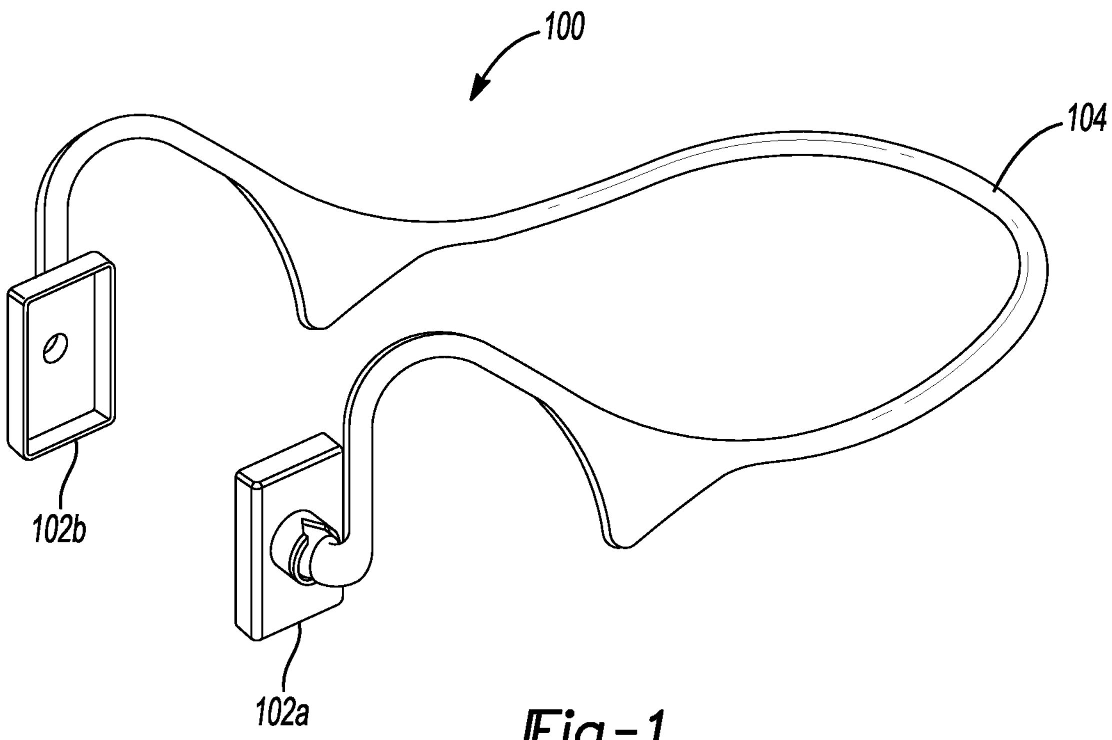
FIG. 1 is a perspective view of a bone conduction device in accordance with one or more embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more examples of the present disclosure provide bone conduction headsets having an enhanced immersive audio experience for a user. The bone conduction headsets, in various examples, include a headset having at least a transceiver and a transducer that processes audio signals received from a device using a combination of binaural rendering, device specific equalization, and ear canal equalization. The bone conduction headset is configured in one or more implementations to allow the user to experience the audio signal via a created or simulated 3D audio scene, thereby creating an immersive audio experience comparable to in-ear or over-ear headphones. As such, the user experience is improved.

Figure 2:
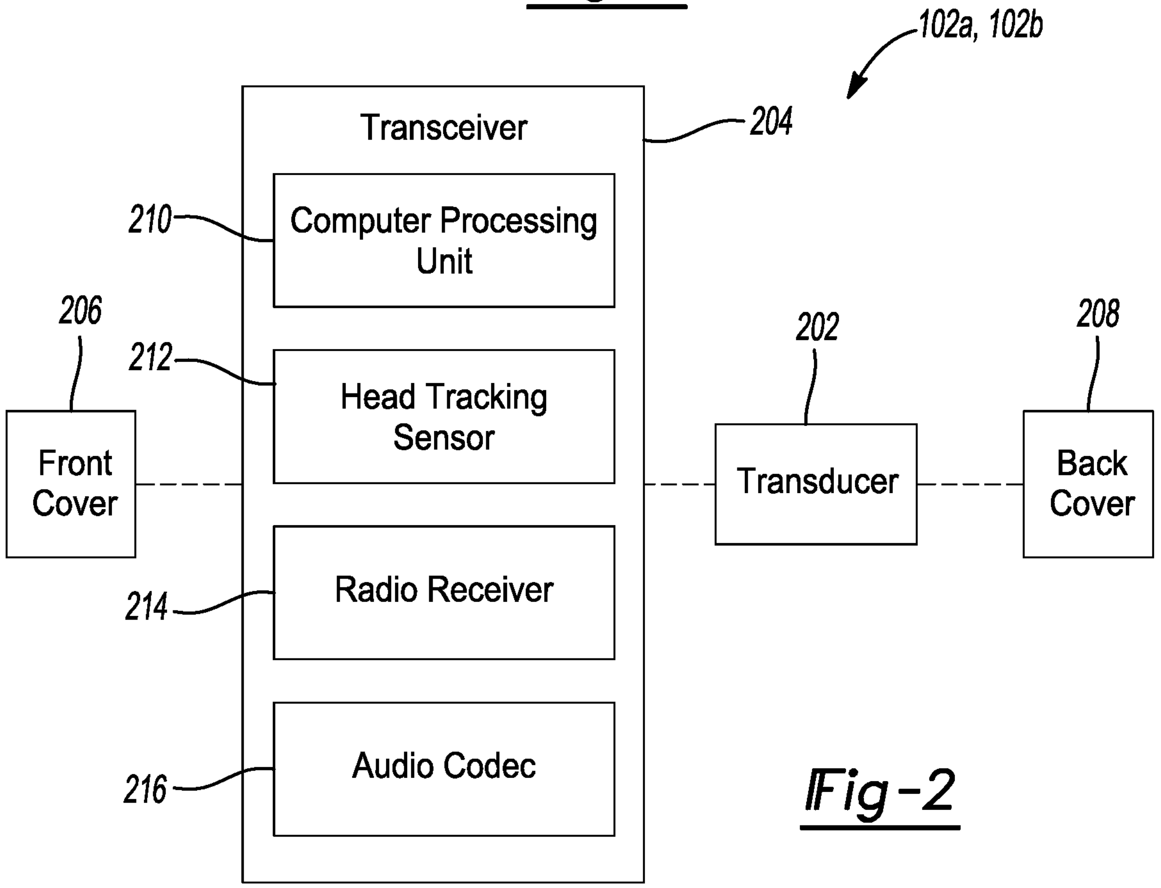
FIG. 2 is a block diagram illustrating an encasement of the bone conduction device of FIG. 1 in accordance with one or more embodiments of the present disclosure.
Figure 3:
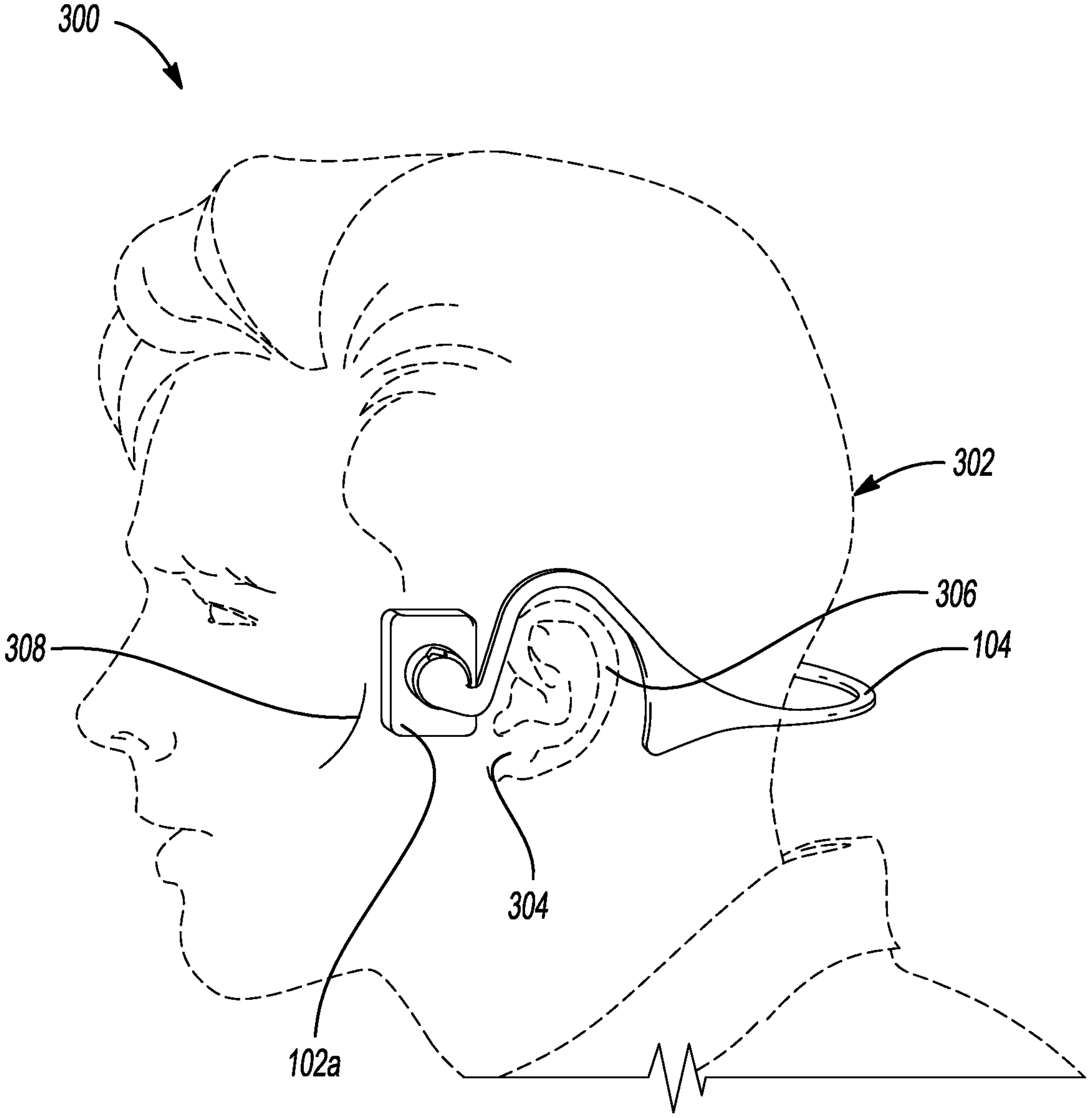
FIG. 3 is a perspective view of the bone conduction device of FIG. 1 on a head of a user in accordance with one or more embodiments of the present disclosure.

With reference to FIGS. 1-3, a bone conduction headset 100 (FIG. 1) is illustrated. The bone conduction headset 100 generally includes a pair of encasements 102*a*, 102*b* and a headband 104. For example, the encasements 102*a*, 102*b* enclose at least a transducer 202 (FIG. 2) and a transceiver 204 (FIG. 2). The encasements 102*a*, 102*b* of the bone conduction headset 100 are attached to the headband 104. For example, the encasements 102*a*, 102*b* of the bone conduction headset 100 are attached to the headband 104 via one or more screws, glue, or are molded to form a unibody as a part of the headband 104. As another example, the headband 104 is shaped in a way that the headband 104 wraps around a head 302 (FIG. 3) of a user 300 and around ears 306 of the user 300 for placement of the bone conduction headset 100 as is further described below.

The encasement 102*a*, illustrated in FIG. 2, includes a transducer 202 and a transceiver 204. The transceiver 204 is programmed to receive wireless audio signals from, for example, a user device (not shown) of the user 300. For example, the user device may be a mobile device, a computer, a sound stereo, or any other audio source. The transceiver 204 may be programmed to receive one or more wireless audio signals via any type of communicative pathway, such as Bluetooth® for example. As another example, the transceiver 204 may receive one or more automatic wireless audio signals from another source based on vicinity of the transceiver 204 from the source. However, the one or more audio signals may also be received via a wired transmission. It is further understood that the one or more audio signals received from the transceiver 204 have audio data embedded within the one or more audio signals. It should be noted that the encasement 102*b* is configured similarly to and/or includes similar components (e.g., one or more of the same components) as the encasement 102*a*, and therefore, will not be described again in detail.

In operation, the transducer 202 receives the audio data from the transceiver 204, processes the audio data, and converts the audio data to vibrations using one or more herein described systems and methods. The vibrations cause the encasements 102*a*, 102*b* to vibrate against the user's 300 zygomatic bones 308 (e.g., cheekbone), thereby emulating sounds to the user that provide an improved user experience.

Figure 4:
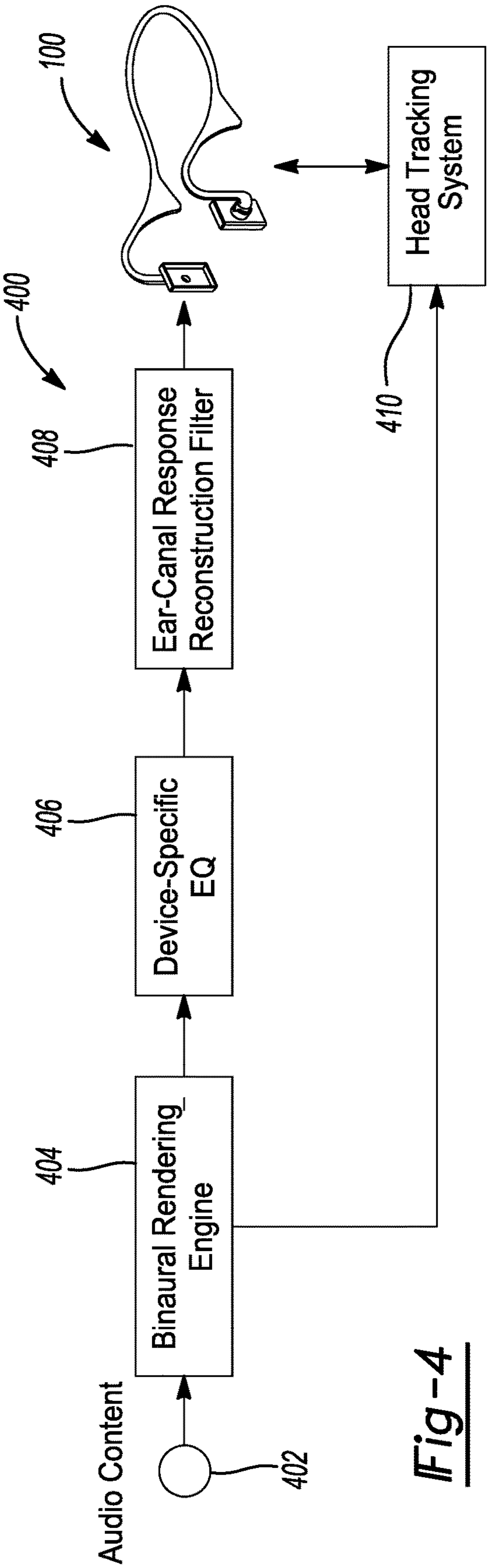
FIG. 4 is a block diagram illustrating components for processing of audio content in accordance with one or more embodiments of the present disclosure.

The transceiver 204 in one or more examples includes a computer processing unit 210, a head tracking sensor 212, a radio receiver 214, and an audio codec 216. The computer processing unit 210 operates as a controller and is configured to coordinate the processing of the one or more audio signals, as is further explained in the description related to FIG. 4. The head tracking sensor 212 detects movement of the user's 300 head and communicates the movement of the user's 300 head to a head tracking system 410 (FIG. 4). For example, the head tracking sensor 212 communicates the angle of orientation of the user's 300 head to the head tracking system. The radio receiver 214 is configured to allow the transceiver 204 to receive radio signals. The radio receiver 214 is capable of receiving radio signals of any frequency and convert the received radio signals to audio and/or sound. The audio codec 216 is a subcomponent of the transceiver 204 that is configured to encode analog audio as digital signals and decode digital signals back to analog audio. In other words, the audio codec 216 performs analog-to-digital and digital-to-analog processing, which may include compressing an audio file for transmission and decompressing the received audio files upon playback.

It should be noted that the encasement 102*a* encases the transducer 202 and the transceiver 204 within a front cover 206 and a back cover 208. Because the front cover 206 is disposed directly upon the cheekbone 308 of the user 300, the front cover 206 is formed from a comfortable material such as rubber, foam, cloth, or other suitable material. The back cover 208 may also be formed from rubber, foam, cloth, or other suitable materials.

Referring to FIG. 3, use of the bone conduction headset 100 is illustrated upon the head 302 of the user 300. The encasement 102*a* of the bone conduction headset 100 is shown positioned proximate to the tragus 304 (e.g., foremost anatomy of the user's 300 ear 306 relative to the zygomatic bone 308) of the user 300. The encasement 102*b* (not shown in FIG. 3) is positioned in an analogous position as the encasement 102*a* with reference to the user's 300 head. More specifically, the encasements 102*a*, 102*b* are placed anywhere upon the user's 300 zygomatic bones 308 (e.g., cheekbone). The encasements 102*a*, 102*b* of the bone conduction headset 100 also may be positioned in any orientation upon the head of the user 300. For example, the encasements 102*a*, 102*b* of the bone conduction headset 100 may be positioned behind the ears 306 of the user 300 or at a different location against the face of the user 300.

Referring to FIG. 4, a block diagram 400 for processing received audio content 402 (e.g., the one or more audio signals) is depicted. In one or more examples, a binaural rendering engine 404 that is a sub-system and/or software system of the transceiver 204 simulates a natural hearing experience of the one or more audio signals by generating a 3D audio scene using one or more separate audio channels for each ear 306 of the user 300. The binaural rendering engine 404 in some configurations is a hardware system encased within one, or each, of the encasements 102*a*, 102*b*.

The binaural rendering engine 404 can also be a combination of hardware and software. The simulation of the natural hearing experience in one or more examples considers differences in timing, level, and spectral content between the one or more audio signals received by the transceiver 204. The simulation of the natural hearing experience also considers a shape of the head 302 of the user 300 and the shape of the ears 306 of the user 300. That is, the flow 400 is implemented in a way that processes the one or more audio signals to provide an improved simulated or enhanced audio sound using one or more different sounds and/or user characteristics and/or properties.

The binaural rendering engine 404 is configured to provide Head-Related Transfer Function (HRTF) filtering using a database of HRTF measurements as described in more detail herein. The HRTF measurements, in one or more implementations, are based on an average head and ear shape of a group of people. It is understood that the average head and ear shape may be based on any sized group of people. In some examples, the binaural rendering engine 404 selects an HRTF filter based on the HRTF measurements, which are determined through the utilization of specialized equipment such as microphones or 3D scanners. For example, the binaural rendering engine 404 may select the HRTF filter from a database of stored HRTF filters, wherein the stored HRTF filters may be differently configured. As another example, the binaural rendering engine 404 may select a particular HRTF filter from the database of HRTF filters based on a distance from a desired location or interpolation based on one or more measured points. It should be noted that different criteria or factors, or a combination of criteria and factors, may be used when selecting one or more HRTF filters.

The binaural rendering engine 404 utilizes HRTF filtering to simulate acoustic properties of the head 302 and/or the ears 306 of the user 300. The HRTF filtering of the binaural rendering engine 404 affects the way sound waves propagate and are received by the ears 306 of the user 300. For example, the HRTF filter transforms the one or more audio signals received by the transceiver 204 into a new audio wave that is tailored specifically to the head 302 and/or the ears 306 of the user 300. That is, HRTF filtering is used in one or more examples to generate an output that better approximates expected sound in ears 306 of the user 300. In other words, the received one or more audio signals pass through the HRTF filter, therein transforming the unprocessed audio signal so that the user 300 perceives a more normalized sound that is more audibly pleasing to the user.

In one or more implementations, the binaural rendering engine 404 uses reverberation modeling such that a particular HRTF filter can be selected. For example, the reverberation modeling simulates the interaction between a sound source and surfaces in an environment, such as walls, floors, ceilings, head, ears, and/or torso before reaching the ears 306 of the user 300. For example, the surfaces in the environment are reflection points that the one or more audio signals interact with. As another example, the reverberation modeling captures the size of the room, based on the way the sound waves bounce off surfaces in the environment. A 3D audio scene is created by the binaural rendering engine 404 based on the reflections of the one or more audio signals against the surfaces in the environment. It is understood that the 3D audio scene can be created before or simultaneously with the process the reverberation modeling takes. As another example, the binaural rendering engine 404 may use any type of modeling such that a particular HRTF filter can be selected.

The binaural rendering engine 404 applies an HRTF filter to each of the audio sources. In some examples, the HRTF filter that is selected by the binaural rendering engine 404 is based on a particular location in space of the audio source. Furthermore, because each of the encasements 102*a*, 102*b* has a respective binaural rendering engine 404 in some examples, the binaural rendering engine 404 of the encasement 102*a* may apply a different HRTF filter relative to the HRTF filter the binaural rendering engine 404 of the encasement 102*b* applies. For example, there may be one or more audio sources that send the audio content. In the case wherein there are more than one audio source, the transceiver 204 receives at least two audio signals from each of the audio sources (e.g., one audio signal for the right ear and one audio signal for the left ear of the user 300). The binaural rendering engine 404 then sums each of the one or more audio signals from each of the audio sources before passing the summed audio signals to a device-specific EQ 406. The audio signals are summed or combined, for example, using any suitable audio signal combining method.

The device-specific EQ 406, in one or more examples, is implemented in software. It is to be understood that the device-specific EQ 406 may be a software system included as a subcomponent of the transceiver 204. The device-specific EQ 406 can also be implemented in a hardware system forming part of the operating system of the bone conduction headset 100. The device-specific EQ 406 is an equalization tool, in one or more examples, that enhances or improves, the 3D audio scene generated by the binaural rendering engine 404 on a particular device. For example, the device-specific EQ 406 may enhance or improve the 3D audio scene on the bone conduction headset 100. For example, the device-specific EQ 406 is configured to adjust a frequency response of the bone conduction headset 100 so that the HRTF filter is better matched to the device (e.g., the bone conduction headset 100) itself. That is, the device-specific EQ 406 is used to improve the frequency response of the bone conduction headset 100 so that the HRTF filter is better matched to the device (e.g., the bone conduction headset 100) itself. The device-specific EQ 406 adjusts and/or improves the frequency response of the bone conduction headset 100 by boosting and/or attenuating specific frequencies and/or adjusting settings to reduce distortion or other audio artifacts that may affect the binaural audio playback. For example, the device-specific EQ 406 is configured to cause the frequency response to be as flat as possible. It is understood that the EQ is device specific based on the hardware and/or software aspects of that particular device.

The ear-canal response reconstruction filter 408 is configured as a filter used to recreate an effect that an ear canal would have on the perceived sound of the one or more audio signals. In one or more examples, the ear-canal reconstruction filter 408 adjusts the frequency response of the audio signals to recreate the effect the ear canal would have on the one or more audio signals (e.g., simulate or emulate ear canal audio sounds). It is understood that the ear-canal response reconstruction filter 408 may be a software system included as a subcomponent of the transceiver 204.

The ear-canal response reconstruction filter 408 is utilized due to the bone conduction headset 100 not engaging the ear canal of the user 100, but rather causing the transducer 202 to vibrate against the cheekbone 308 of the user 300. For example, when sound waves enter the ear canal, the sound waves are filtered and altered by the shape and acoustical properties of the ear canal before the sound waves reach the eardrum. Because the one or more audio signals do not pass directly through the ear canal, the ear-canal response filter 408 adjusts the frequency response of the one or more audio signals to compensate for the effect the ear canal would have had on the one or more audio signals. It is understood that the ear-canal response filter 408 also compensates for any effect the physical design of the bone conduction headset 100 may have on the received one or more audio signals.

The bone conduction headset 100 communicates with a head tracking system 410. The head tracking system also communicates with the binaural rendering engine 404. The head tracking system 410 compensates for the movement of the user's 300 head 302. For example, the head tracking system 410 receives an indication from the head tracking sensor 212 that the user's 300 head 302 has moved at a particular angle of orientation. The head tracking system 410, based on the angle of orientation, causes the flow 400 to operate in a particular way so that the angle of orientation of the user's 300 head 302 is considered (e.g., used by one or more processes) while the various filters (e.g., the HRTF filter) are applied to the one or more audio signals. By applying the various filters based on the angle of orientation of the user's 300 head 302, the audio content the user 300 hears is perceived as if the sound source has remained at the original position, before the user's 300 head 302 moved. For example, without the use of headphones, in the instance wherein the user's 300 head 302 moves, the perceived audio content would change to indicate to the user where the audio content is coming from. It is understood that the head tracking system 410 is included within the bone conduction headset 100. More specifically, it is further understood that the head tracking system 410 may be included within the transceiver 204 or as a separate hardware component disposed between the encasements 102*a*, 102*b*. As an example, each of the components (e.g., the binaural rendering engine 404, the device-specific EQ 406, the ear-canal response reconstruction filter 408, and/or the head tracking system 410) are included within a digital signal processing path (e.g., the block diagram 400) of the bone conduction headset 100. As a further example, each of the components (e.g., the binaural rendering engine 404, the device-specific EQ 406, the ear-canal response reconstruction filter 408, and/or the head tracking system 410) collaborate to render binaural audio to synthesize virtual sound sources.

Figure 5:
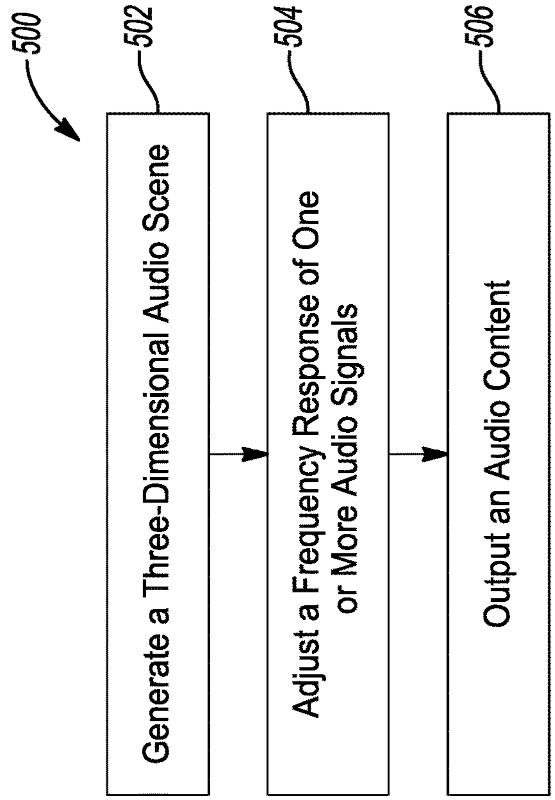
FIG. 5 is a flowchart illustrating the processing of audio content in accordance with one or more embodiments of the present disclosure.

FIG. 5 is a flowchart illustrating an example method 500 for generating an enhanced immersive audio experience for the user 300. For example, the method 500 causes the user 300 to hear the sound via the bone conduction headset 100 in a similar way as if the sound was transmitted through an in-hear headset or an over-ear headset, whereby the one or more audio signals pass directly through the ear canal of the user 300. At step 502, the 3D audio scene is generated. For example, the 3D audio scene is generated by the binaural rendering engine 404. As a further example, the generation of the 3D audio scene is based on the one or more audio signals. It is understood that the one or more audio signals are received by the transceiver 204 of the bone conduction headset 100. It is also understood that the binaural rendering engine 404 processes the received one or more audio signals so that the 3D audio scene may be generated. As another example, the binaural rendering engine 404 may either be a hardware system encased within one, or each, of the encasements 102*a*, 102*b* or a sub-system and/or software system of the transceiver 204 of the bone conduction headset 100.

In other examples, the binaural rendering engine 404 simulates the reflection of the one or more audio signals. The simulation of the reflection of the one or more audio signals is based on reverberation modeling, for example. However, it is to be understood that the simulation of the reflection of the one or more audio signals may be based on any type of modeling. As another example, the binaural rendering engine 404 applies the HRTF filter and the simulation to the one or more audio signals. The HRTF filtering is based on the database of HRTF measurements, for example. As further example, the HRTF measurements are based on an average head shape and an average ear shape of a group of users.

At step 504, a frequency response is adjusted. For example, the frequency response is adjusted based on the 3D audio scene. In one or more examples, the frequency response is adjusted by a filter that simulates an ear canal of the user. In some examples, the frequency response is adjusted by the ear-canal response reconstruction filter 408. For example, the ear-canal response reconstruction filter 408 may either be a hardware system encased within one, or each, of the encasements 102*a*, 102*b* or a sub-system and/or software system of the transceiver 204 of the bone conduction headset 100. As another example, the device-specific EQ 404 further adjusts the frequency response. The device-specific EQ 404 may adjust the frequency response based on the 3D audio scene and/or the type of bone conduction headset as well as the 3D audio scene. It is to be understood that the device-specific EQ 404 may adjust the frequency response before the ear-canal response reconstruction filter 408 adjusts the frequency response, for example.

At step 506, the audio content is outputted. For example, the audio content is outputted based on the adjusted frequency response. As another example, the outputted audio content is an immersive audio experience for the user 300. As a further example, the outputting of the audio content comprises causing the one or more transducers 202 to vibrate against one or more cheekbones of the user 300. Causing the one or more transducers 202 to vibrate against the one or more cheekbones of the user is based on the adjusted frequency response, for example. In some examples, the vibration causes the user 300 to receive the audio content as the immersive audio experience. The bone conduction headset 100 also includes the head tracking system 410. The head tracking system 410, for example, communicates with the binaural rendering engine 404. As another example, the head tracking system 410 compensates for a movement of the head 302 of the user 300.

Based on the foregoing, the following provides a general overview of the present disclosure and is not a comprehensive summary. In a first embodiment A1, a method comprising the generation of a three-dimensional audio scene by a bone conduction headset, based on one or more audio signals. A frequency response of the one or more audio signals is adjusted by the bone conduction headset, based on the three-dimensional audio scene, wherein the adjusted frequency response simulates a response of an ear canal of a user. An audio content is outputted by the bone conduction headset, based on the adjusted frequency response.

In a second embodiment A2, which may include the first embodiment A1, wherein the three-dimensional audio scene is generated by a binaural rendering engine. In a third embodiment A3, which may include any combination of the first through second embodiments A1-A2, wherein the frequency response is adjusted by an ear-canal response reconstruction filter. In a fourth embodiment A4, which may include any combination of the first through third embodiments A1-A3, further comprising the adjustment of a frequency response of the bone conduction headset by a device-specific EQ, based on the three-dimensional audio scene and a type of the bone conduction headset. In a fifth embodiment A5, which may include any combination of the first through fourth embodiments A1-A4, wherein generating the three-dimensional audio scene comprises simulating, based on reverberation modeling, a reflection of the one or more audio signals against one or more surfaces; and applying a head-related transfer function (HRTF) filter and the simulation to the one or more audio signals, wherein the HRTF filter is created based on a database of HRTF measurements. In a sixth embodiment A6, which may include any combination of the first through fifth embodiments A1-A5, wherein the HRTF measurements are based on an average head shape and an average ear shape of a group of users. In a seventh embodiment A7, which may include any combination of the first through sixth embodiments A1-A6, wherein outputting the audio content comprises causing, based on the adjusted frequency response, one or more transducers to vibrate against one or more cheekbones of the user, wherein the vibration causes the user to receive the audio content. In an eight embodiment A8, which may include any combination of the first through seventh embodiments A1-A7, wherein the bone conduction headset includes a head tracking system, wherein the head tracking system communicates with the binaural rendering engine and compensates for a movement of a head of the user.

In a ninth embodiment A9, which may include any combination of the first through eighth embodiments A1-A8, a binaural rendering engine configured to generate, based on one or more audio signals, a three-dimensional audio scene; an ear-canal response reconstruction filter configured to adjust, based on the three-dimensional audio scene, a frequency response of the one or more audio signals, wherein the adjusted frequency response simulates a response of an ear canal of a user; and one or more transducers configured to output, based on the adjusted frequency response, an audio content is disclosed.

In a tenth embodiment A10, which may include any combination of the first through ninth embodiments A1-A9, wherein the bone conduction headset is further configured to adjust by a device-specific EQ, based on the three-dimensional audio scene and the type of bone conduction headset, a frequency response of the bone conduction headset. In an eleventh embodiment A11, which may include any combination of the first through tenth embodiments A1-A10, wherein generating the three-dimensional audio scene comprises simulating, based on reverberation modeling, a reflection of the one or more audio signals against one or more surfaces; and applying a head-related transfer function (HRTF) filter and the simulation to the one or more audio signals, wherein the HRTF filter is created based on a database of HRTF measurements. In a twelfth embodiment A12, which may include any combination of the first through eleventh embodiments A1-A11, wherein the HRTF measurements are based on an average head shape and an average ear shape of a group of users. In a thirteenth embodiment A13, which may include any combination of the first through twelfth embodiments A1-A12, wherein outputting the audio content comprises causing, based on the adjusted frequency response, one or more transducers to vibrate against one or more cheekbones of the user, wherein the vibration causes the user to receive the audio content. In a fourteenth embodiment A14, which may include any combination of the first through thirteenth embodiments A1-A13, wherein the bone conduction headset includes a head tracking system, wherein the head tracking system communicates with the binaural rendering engine and compensates for a movement of a head of the user.

In a fifteenth embodiment A15, which may include any combination of the first through fourteenth embodiments A1-A14, one or more non-transitory computer-readable media storing processor-executable instructions that, when executed by at least one processor, cause the at least one processor to generate by a bone conduction headset, based on one or more audio signals, a three-dimensional audio scene; adjust by the bone conduction headset, based on the three-dimensional audio scene, a frequency response of the one or more audio signals, wherein the adjusted frequency response simulates a response of an ear canal of a user; and output by the bone conduction headset, based on the adjusted frequency response, an audio content. In a sixteenth embodiment A16, which may include any combination of the first through fifteenth embodiments A1-A15, wherein the at least one processor is further configured to adjust by a device-specific EQ, based on the three-dimensional audio scene and the type of bone conduction headset, a frequency response of the bone conduction headset. In a seventeenth embodiment A17, which may include any combination of the first through sixteenth embodiments A1-A16, wherein outputting the audio content comprises causing, based on the adjusted frequency response, one or more transducers to vibrate against one or more cheekbones of the user, wherein the vibration causes the user to receive the audio content. In an eighteenth embodiment A18, which may include any combination of the first through seventeenth embodiments A1-A17, wherein the three-dimensional audio scene is generated by a binaural rendering engine. In a nineteenth embodiment A19, which may include any combination of the first through eighteenth embodiments A1-A18, wherein the frequency response is adjusted by an ear-canal response reconstruction filter. In a twentieth embodiment A20, which may include any combination of the first through nineteenth embodiments A1-A19, wherein the bone conduction headset includes a head tracking system, wherein the head tracking system communicates with the binaural rendering engine and compensates for a movement of a head of the user.

Unless otherwise expressly indicated herein, all numerical values indicating mechanical/thermal properties, compositional percentages, dimensions and/or tolerances, or other characteristics are to be understood as modified by the word “about” or “approximately” in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean “at least one of A, at least one of B, and at least one of C.”

In this application, the term “controller” and/or “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

generating by a bone conduction headset, based on one or more audio signals, a three-dimensional audio scene;

adjusting by the bone conduction headset, based on the three-dimensional audio scene, a frequency response of the one or more audio signals, wherein the adjusted frequency response simulates a response of an ear canal of a user; and outputting by the bone conduction headset, based on the adjusted frequency response, an audio content, wherein outputting the audio content comprises causing, based on the adjusted frequency response, one or more transducers to vibrate directly against one or more cheekbones of the user, wherein the vibration causes the user to receive the audio content.

2. The method of claim 1, wherein the three-dimensional audio scene is generated by a binaural rendering engine.

3. The method of claim 1, wherein the frequency response is adjusted by an ear-canal response reconstruction filter.

4. The method of claim 1, further comprising:

adjusting by a device-specific equalization tool, based on the three-dimensional audio scene and a type of the bone conduction headset, a frequency response of the bone conduction headset.

5. The method of claim 1, wherein generating the three-dimensional audio scene comprises:

simulating, based on reverberation modeling, a reflection of the one or more audio signals against one or more surfaces; and applying a head-related transfer function (HRTF) filter and the simulation to the one or more audio signals, wherein the HRTF filter is created based on a database of HRTF measurements.

6. The method of claim 5, wherein the HRTF measurements are based on an average head shape and an average ear shape of a group of users.

7. The method of claim 1, wherein the bone conduction headset includes a head tracking system, wherein the head tracking system communicates with a binaural rendering engine and compensates for a movement of a head of the user.

8. A bone conduction headset comprising:

a binaural rendering engine configured to:

generate, based on one or more audio signals, a three-dimensional audio scene;

an ear-canal response reconstruction filter configured to:

adjust, based on the three-dimensional audio scene, a frequency response of the one or more audio signals, wherein the adjusted frequency response simulates a response of an ear canal of a user; and one or more transducers configured to:

output, based on the adjusted frequency response, an audio content, wherein outputting the audio content comprises causing, based on the adjusted frequency response, one or more transducers to vibrate directly against one or more cheekbones of the user, wherein the vibration causes the user to receive the audio content.

9. The bone conduction headset of claim 8, wherein the bone conduction headset is further configured to:

adjust by a device-specific equalization tool, based on the three-dimensional audio scene and a type of the bone conduction headset, a frequency response of the bone conduction headset.

10. The bone conduction headset of claim 8, wherein generating the three-dimensional audio scene comprises:

simulating, based on reverberation modeling, a reflection of the one or more audio signals against one or more surfaces; and applying a head-related transfer function (HRTF) filter and the simulation to the one or more audio signals, wherein the HRTF filter is created based on a database of HRTF measurements.

11. The bone conduction headset of claim 10, wherein the HRTF measurements are based on an average head shape and an average ear shape of a group of users.

12. The bone conduction headset of claim 8, wherein the bone conduction headset includes a head tracking system, wherein the head tracking system communicates with the binaural rendering engine and compensates for a movement of a head of the user.

13. One or more non-transitory computer-readable media storing processor-executable instructions that, when executed by at least one processor, cause the at least one processor to:

generate by a bone conduction headset, based on one or more audio signals, a three-dimensional audio scene;

adjust by the bone conduction headset, based on the three-dimensional audio scene, a frequency response of the one or more audio signals, wherein the adjusted frequency response simulates a response of an ear canal of a user; and output by the bone conduction headset, based on the adjusted frequency response, an audio content, wherein outputting the audio content comprises causing, based on the adjusted frequency response, one or more transducers to vibrate against one or more cheekbones of the user, wherein the vibration causes the user to receive the audio content.

14. The one or more non-transitory computer-readable media of claim 13, wherein the at least one processer is further caused to:

adjust by a device-specific equalization tool, based on the three-dimensional audio scene and a type of the bone conduction headset, a frequency response of the bone conduction headset.

15. The one or more non-transitory computer-readable media of claim 13, wherein the three-dimensional audio scene is generated by a binaural rendering engine.

16. The one or more non-transitory computer-readable media of claim 13, wherein the frequency response is adjusted by an ear-canal response reconstruction filter.

17. The one or more non-transitory computer-readable media of claim 13, wherein the bone conduction headset includes a head tracking system, wherein the head tracking system communicates with a binaural rendering engine and compensates for a movement of a head of the user.

* * * * *